UNITED STATES PATENT OFFICE.

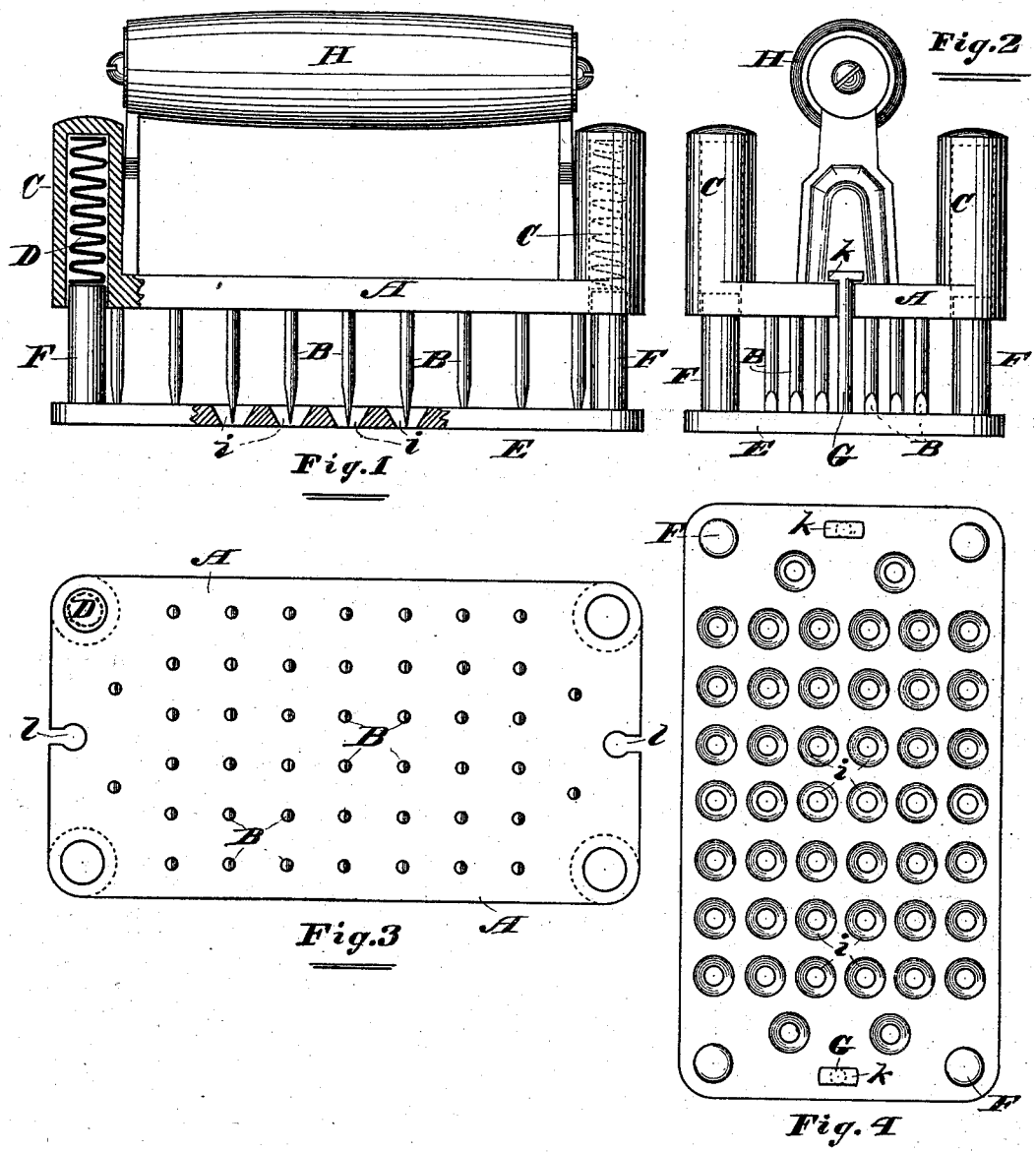

JOHN P. DAVIES, OF CHICAGO, ILLINOIS, ASSIGNOR OF TWO-THIRDS HIS RIGHT TO EVANS & LOUGHLIN, OF SAME PLACE.

IMPROVEMENT IN MEAT-TENDERERS.

Specification forming part of Letters Patent No. 215,511, dated May 20, 1879; application filed February 24, 1879.

*To all whom it may concern:*

Be it known that I, JOHN P. DAVIES, of the city of Chicago, in the county of Cook and State of Illinois, have invented certain new and useful Improvements in Meat-Tenderers; and I hereby declare the following to be a full, clear, and exact description thereof, reference being had to the accompanying drawings, of which—

Figure 1 is a side elevation of my device, with a small part in section; Fig. 2, an end elevation of the same; Fig. 3, a bottom view of the upper plate and teeth, and Fig. 4 a top view of the under plate.

My invention relates to the class of meat-tenderers which comprise parallel metal plates connected together, the upper one being provided with teeth and the lower one with holes for the passage of the said teeth, and in which the lower plate slides up the teeth when the latter are pressed into the meat, and is thrown by means of springs back again even with the ends of the teeth when the latter are withdrawn, thus preventing the lifting of the meat.

The chief obstacles hitherto encountered with devices of the above kind have been, first, their tendency to become impure, owing to small particles of meat finding lodging-places in parts difficult or impossible of access, and putrefying; and, secondly, in the difficulty of thoroughly cleaning the parts when this becomes necessary, as it must from time to time with every device, however constructed.

My object is to overcome the above difficulties by so constructing the device that it shall be almost impossible for particles of meat to find their way to the interior parts, and also by affording the highest possible facilities for cleansing.

My invention consists, first, in the means whereby the upper and lower parts of the device are connected together and rendered readily separable; and, secondly, in the general construction of the device, all as hereinafter more fully set forth.

In the drawings, A is the upper plate, provided with numerous downward projecting teeth B. C C are the hollow posts or sockets, and I prefer to place one of these at each corner of the plate A. These posts are wholly inclosed, save at their bases, where they open through the plate A. Each post incloses a helical spring, D, of a diameter corresponding very nearly with that of the interior of the socket.

E is the lower plate, provided with holes $i$, corresponding exactly in number and relative position with the teeth on the upper plate. It is advisable to have these holes countersunk from the top, as shown in Figs. 1 and 4, in order that when the parts are adjusted together the teeth may enter them without difficulty, even though they shall have become slightly bent by use. F F are the bolts projecting upward, one from each corner of the plate E, entering the sockets C, and resting against the lower ends of the springs D.

This being the construction of the operative parts of the device, the object is now to provide means for connecting them firmly together, and at the same time admit of their being readily separated when occasion requires. This, obviously, may be accomplished in various ways; but the one which I prefer is that represented in the drawings. It consists of two pins, G, of soft pliable metal, projecting upward one from each end of the plate E, to which it is fixed, and each provided with a head, $k$. Each pin passes through and slides within a slot, $l$, in the plate A, the head $k$ preventing it from slipping downward through the same. To detach the parts, it is only necessary to bend the pins out of the slots with the fingers. This being done, and the lower part being removed, there is nothing to retain the springs within the sockets, and these will drop out of their own accord. It is advisable, therefore, to hold the device in an inverted position while separating the parts to prevent the springs from dropping out prematurely and becoming lost.

H is a handle for the device, which may be of any convenient shape.

What I claim as new, and desire to secure by Letters Patent, is—

1. In a meat-tenderer, the device for attaching and detaching the upper and lower portions, consisting of the pins G, of pliable metal, and provided with heads $k$, said pins being permanently fixed to the plate E, projecting upward therefrom, and sitting and sliding within slots $l$ in the plate A, substantially as shown and described.

2. The meat-tenderer consisting of the plate A, provided with the teeth B, sockets C at the corners of the plate A, inclosing the springs D, plate E, having perforations for the passage of the teeth B, bolts F at the corners of the plate E, and entering the sockets C, pins G, projecting upward from the plate E, passing through holes or slots in the plate A, and terminating with heads $k$, and handle H, substantially as described.

JOHN P. DAVIES.

Witnesses:
P. C. DYRENFORTH,
EDWIN F. MERRILL.